(12) United States Patent
Luehrsen (10) Patent No.: US 10,166,961 B2
(45) Date of Patent: Jan. 1, 2019

(54) VACUUM SCAVENGING IN HYBRID VEHICLES

(71) Applicant: Ford Global Technologies, LLC, Dearborn, MI (US)

(72) Inventor: Eric Luehrsen, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1096 days.

(21) Appl. No.: 14/098,385

(22) Filed: Dec. 5, 2013

(65) Prior Publication Data

US 2015/0158477 A1   Jun. 11, 2015

(51) Int. Cl.
| | |
|---|---|
| *B60T 13/72* | (2006.01) |
| *B60T 13/52* | (2006.01) |
| *B60T 17/02* | (2006.01) |

(52) U.S. Cl.
CPC .............. *B60T 13/72* (2013.01); *B60T 13/52* (2013.01); *B60T 17/02* (2013.01); *Y10S 903/947* (2013.01)

(58) Field of Classification Search
None
See application file for complete search history.

(56) References Cited

U.S. PATENT DOCUMENTS

| | | | | |
|---|---|---|---|---|
| 3,661,054 | A | * | 5/1972 | Brown ................... B60T 13/244 91/369.4 |
| 4,175,523 | A | * | 11/1979 | Noguchi ................ F02M 27/02 123/3 |
| 6,305,757 | B1 | * | 10/2001 | Ohsaki ..................... B60T 13/46 188/356 |
| 7,353,812 | B1 | * | 4/2008 | Gosdzinski ........... F02D 9/1055 123/339.23 |
| 2003/0116131 | A1 | * | 6/2003 | Majima ................... F02D 13/04 123/406.53 |
| 2004/0182072 | A1 | * | 9/2004 | Majima ................... F02D 13/04 60/285 |
| 2004/0237923 | A1 | * | 12/2004 | Kayama ................. B60T 13/52 123/179.4 |
| 2005/0165522 | A1 | * | 7/2005 | Lehner .................... B60T 13/52 701/31.1 |
| 2005/0218716 | A1 | * | 10/2005 | Collins ................... B60T 13/72 303/115.3 |
| 2006/0288766 | A1 | * | 12/2006 | Wang ..................... G01L 27/007 73/114.37 |
| 2007/0251217 | A1 | * | 11/2007 | Majima ................... F02D 13/04 60/285 |

(Continued)

FOREIGN PATENT DOCUMENTS

CN           102050099 A  *  5/2011

OTHER PUBLICATIONS

Ulrey, Joseph N. et al., "Method and System for Fuel Vapor Management," U.S. Appl. No. 13/660,884, filed Oct. 25, 2012, 35 pages.

(Continued)

*Primary Examiner* — Shelley Chen
(74) *Attorney, Agent, or Firm* — Julia Voutyras; McCoy Russell LLP (57) ABSTRACT

A method for a hybrid-electric vehicle may comprise, while the hybrid-electric vehicle is moving and in an absence of fuel being directed to an engine, directing engine intake air through an ejector to supply vacuum to a brake booster independent of a brake booster vacuum.

7 Claims, 6 Drawing Sheets

(56) References Cited

U.S. PATENT DOCUMENTS

| | | | | |
|---|---|---|---|---|
| 2008/0264059 | A1* | 10/2008 | Hirooka | B60T 13/52 60/547.1 |
| 2008/0267789 | A1* | 10/2008 | Hirooka | B60T 17/02 417/187 |
| 2010/0047081 | A1* | 2/2010 | Hirooka | B60T 17/02 417/54 |
| 2011/0183812 | A1* | 7/2011 | Cunningham | B60T 13/72 477/183 |
| 2012/0096849 | A1* | 4/2012 | Cunningham | B60T 17/02 60/547.1 |
| 2012/0234123 | A1* | 9/2012 | Whitney | F16H 61/143 74/473.1 |
| 2012/0237366 | A1* | 9/2012 | Pursifull | F04B 49/03 417/54 |
| 2012/0237367 | A1* | 9/2012 | Cunningham | F02M 35/10 417/55 |
| 2012/0237368 | A1* | 9/2012 | Pursifull | F02B 37/164 417/55 |
| 2012/0285421 | A1* | 11/2012 | Cunningham | B60T 17/02 123/436 |
| 2013/0233287 | A1 | 9/2013 | Leone | |
| 2013/0340732 | A1 | 12/2013 | Pursifull et al. | |

OTHER PUBLICATIONS

Ulrey, Joseph N. et al., "Method and System for Vacuum Generation," U.S. Appl. No. 13/670,664, filed Nov. 11, 2012, 37 pages.

Pursifull, Ross D., "Method and System for Vacuum Generation," U.S. Appl. No. 13/802,020, filed Mar. 3, 2013, 43 pages.

Pursifull, Ross D., "Systems and Methods for Multiple Aspirators for a Constant Pump Rate," U.S. Appl. No. 13/962,526, filed Aug. 8, 2013, 44 pages.

Pursifull, Ross D., "Parallel Aspirator Arrangement for Vacuum Generation and Compressor Bypass," U.S. Appl. No. 14/038,497, filed Sep. 26, 2013, 63 pages.

Luehrsen, Eric, "Bidirectional Valved Aspirator for Surge Control and Vacuum Generation," U.S. Appl. No. 14/102,133, filed Dec. 10, 2013, 47 pages.

* cited by examiner

VACUUM SCAVENGING IN HYBRID VEHICLES

FIELD

The present application relates to supplying vacuum to vacuum consuming devices in hybrid-electric vehicle systems.

BACKGROUND AND SUMMARY

Vehicle engine systems may comprise one or more aspirators coupled to an intake air passage of an engine to harness engine airflow for generation of vacuum for use by various vacuum-actuated devices such as a brake booster. Aspirators (which may alternatively be referred to as ejectors, venturi pumps, jet pumps, and eductors) are passive devices that can provide low-cost vacuum generation, wherein an amount of vacuum generated at an aspirator can be controlled with a flow regulating valve controlling the motive air flow rate through the aspirator. For example, when incorporated in an engine intake system, aspirators may generate vacuum using energy that would otherwise be lost to throttling, and the generated vacuum may be used in vacuum-powered devices such as brake boosters.

Cunningham (U.S. Patent Application 2012/0285421) discloses a method for controlling engine vacuum production wherein when an engine is running, fuel is being supplied to the engine, and a vacuum level of a vacuum actuated device is below a threshold level, vacuum is supplied to the vacuum actuated device via the engine intake manifold while the engine throttle is closed and an ejector valve is closed. Furthermore, when a vacuum level of a vacuum actuated device is above a threshold level, vacuum is supplied to the vacuum actuated device via the engine intake manifold and via an ejector by directing engine intake air through the ejector.

The inventors herein have recognized potential issues with the above conventional approaches. Namely, closing the throttle when supplying vacuum to vacuum actuated devices when a vacuum level of a vacuum actuated device is below a threshold level may be detrimental to fuel economy, engine emissions, NVH, vehicle drivability, vehicle operability, and the like. Furthermore, during idling in a hybrid-electric vehicle system, the engine is decoupled from the propulsion system, and thus conventional methods may not address supplying vacuum to vacuum actuated devices when fuel is not being supplied to the engine. Further still, a hybrid-electric vehicle may remain stationary even when the brake pedal is not fully depressed. Accordingly, operators of hybrid-electric vehicles may bobble the brake pedal while idling, which can deplete the brake booster vacuum. Owing to the engine being off during idling, the brake booster vacuum is conventionally restored by automatically performing an engine pull-up so that intake manifold vacuum may be supplied to the vacuum actuated device. In this way, bobbling the brake actuator may be detrimental to overall fuel economy.

One approach that at least partially addresses the aforementioned issues is a method for a hybrid-electric vehicle, comprising while the hybrid-electric vehicle is moving and in an absence of fuel being directed to an engine, directing engine intake air through an ejector to supply vacuum to a brake booster independent of a brake booster vacuum.

In another embodiment, a method for a hybrid vehicle may comprise during a second condition, comprising when an engine intake manifold vacuum is greater than a threshold intake manifold vacuum, directing engine intake air through an ejector to draw vacuum from a brake booster independent of a brake booster vacuum. Furthermore, during a first condition, the method may comprise while the hybrid-electric vehicle is moving and in an absence of fuel being directed to the engine, directing engine intake air through the ejector to supply vacuum to the brake booster independent of the brake booster vacuum.

In another embodiment, a method for a hybrid vehicle system may comprise, independent of a vacuum level of a vacuum reservoir, during a condition when the hybrid vehicle system is propelled only with motor torque, opening a valve fluidly coupled to an ejector, whereupon opening the valve, vacuum is drawn from the ejector to the vacuum reservoir.

By supplying vacuum to a brake booster independent of brake booster vacuum, for example, even when a brake booster vacuum is greater than a threshold brake booster vacuum and not only when a brake booster vacuum is less than a threshold brake booster vacuum, a length of time during which the brake booster vacuum is greater than a threshold brake booster vacuum level is increased. In this way, the above embodiments achieve at least the technical result of reducing the frequency of engine pull-ups, thereby improving overall fuel economy as compared to conventional methods and systems.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
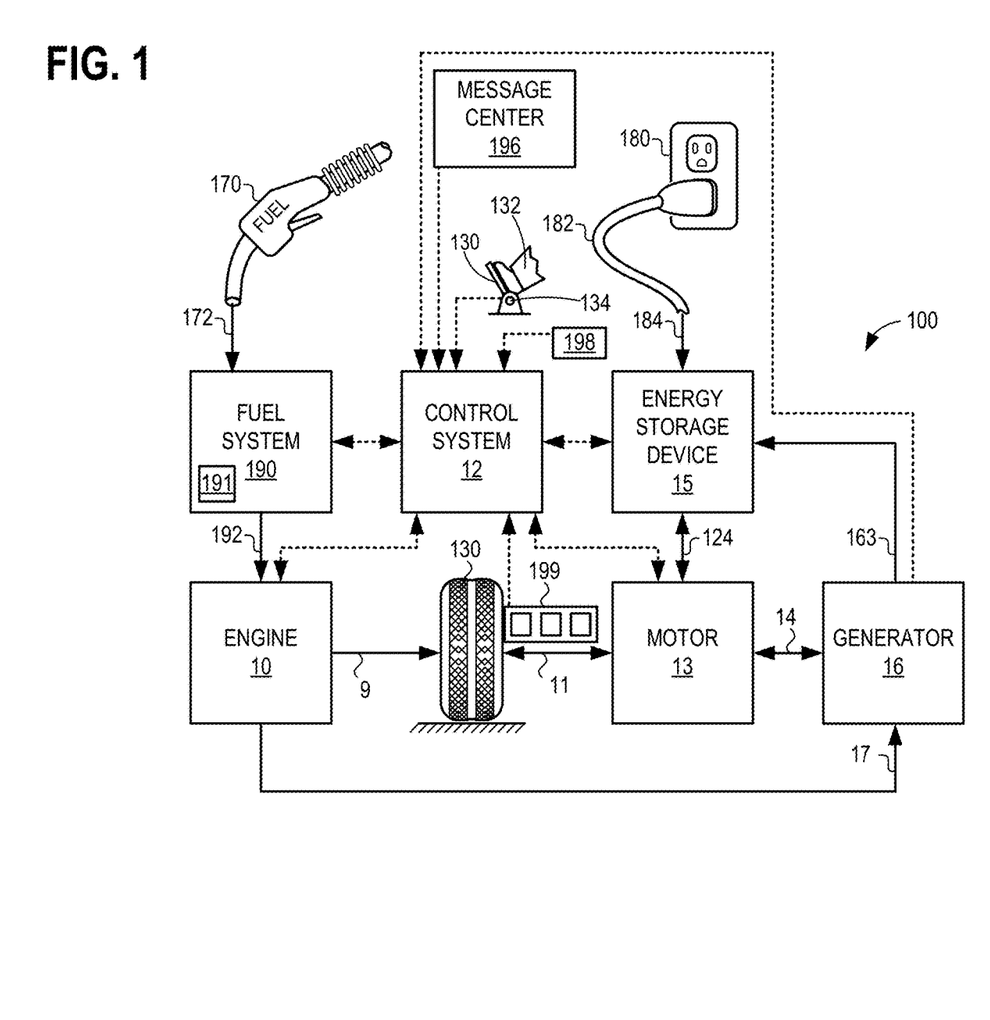
FIG. 1 shows a schematic diagram of am example propulsion system for a hybrid-electric vehicle system.
Figure 2:
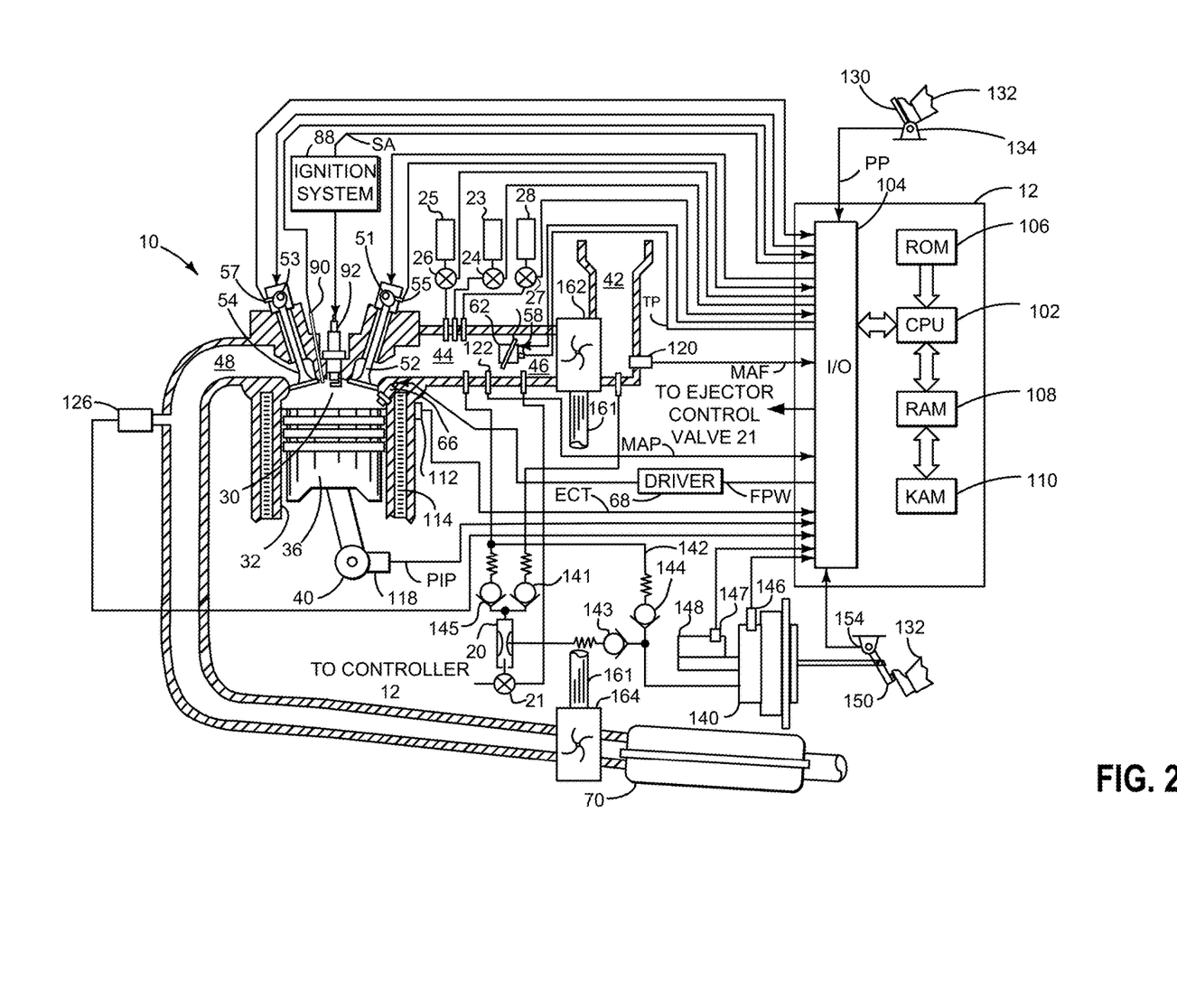
FIG. 2 shows a schematic diagram of an example engine system in a hybrid-electric propulsion system.
Figure 3:
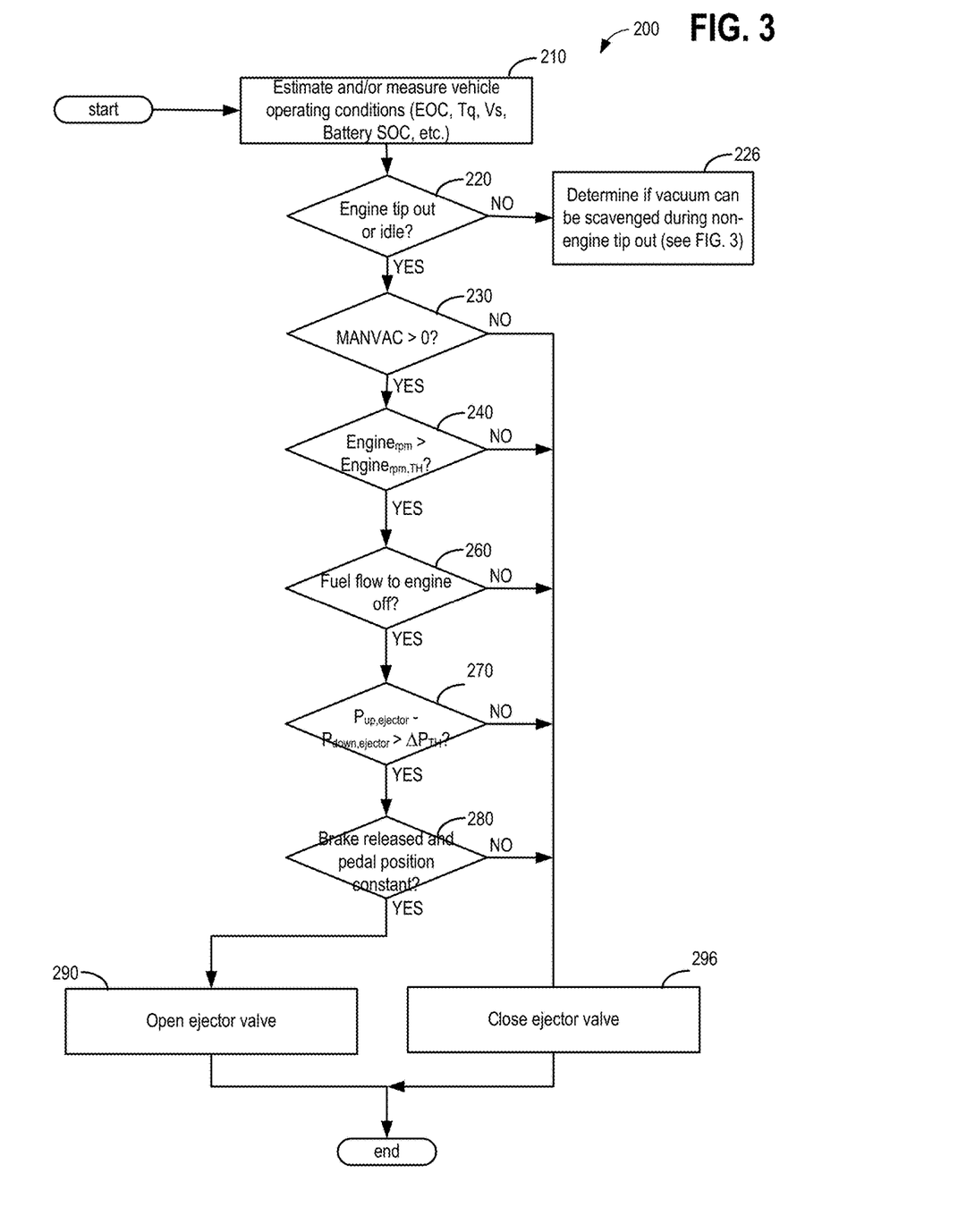
FIG. 3 shows a flow chart for an example method of operating a hybrid-electric vehicle system.
Figure 4:
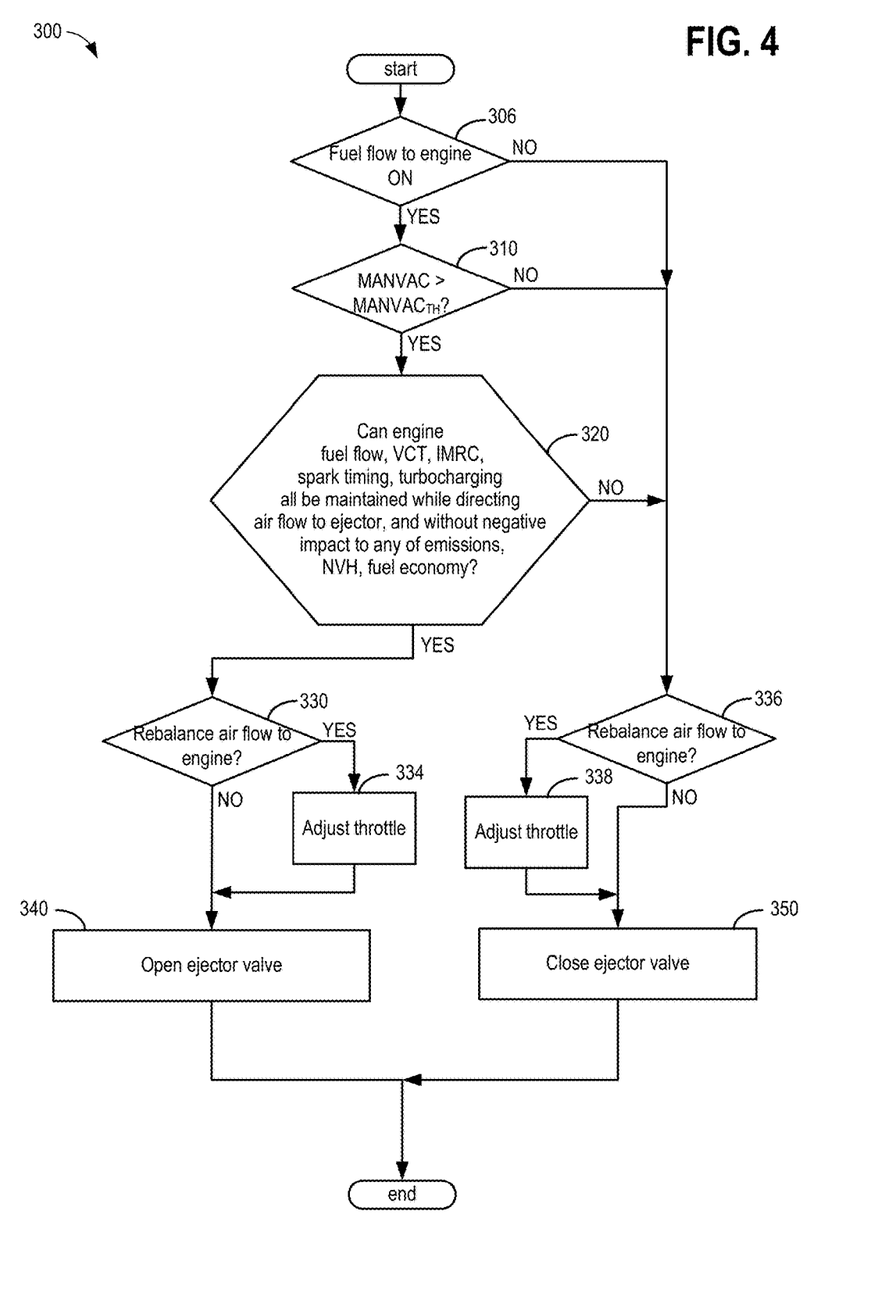
FIG. 4 shows a flow chart for an example method of operating a hybrid-electric vehicle system.
Figure 5:
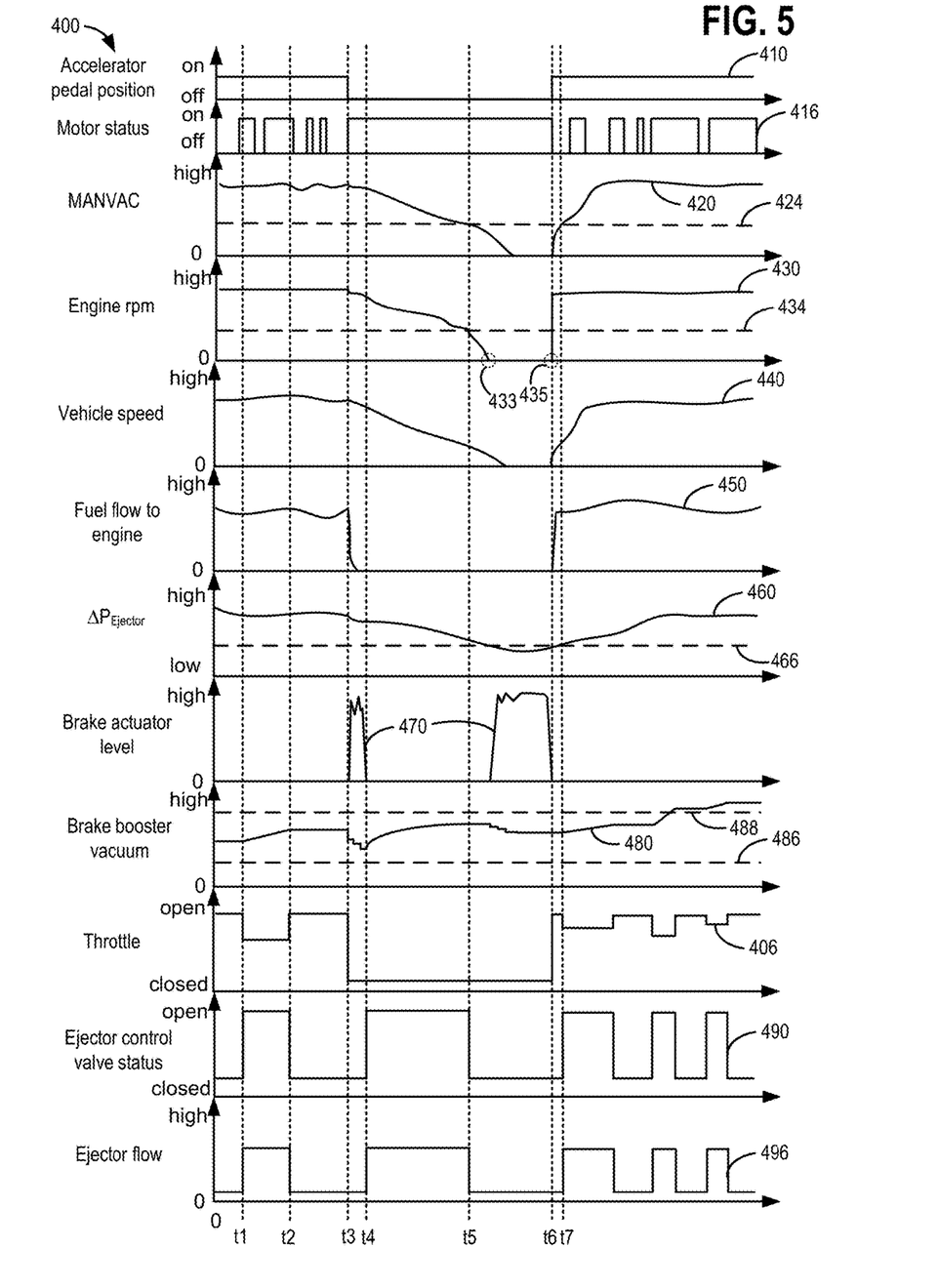
FIG. 5 shows an example timeline for a hybrid-electric vehicle system.
Figure 6:
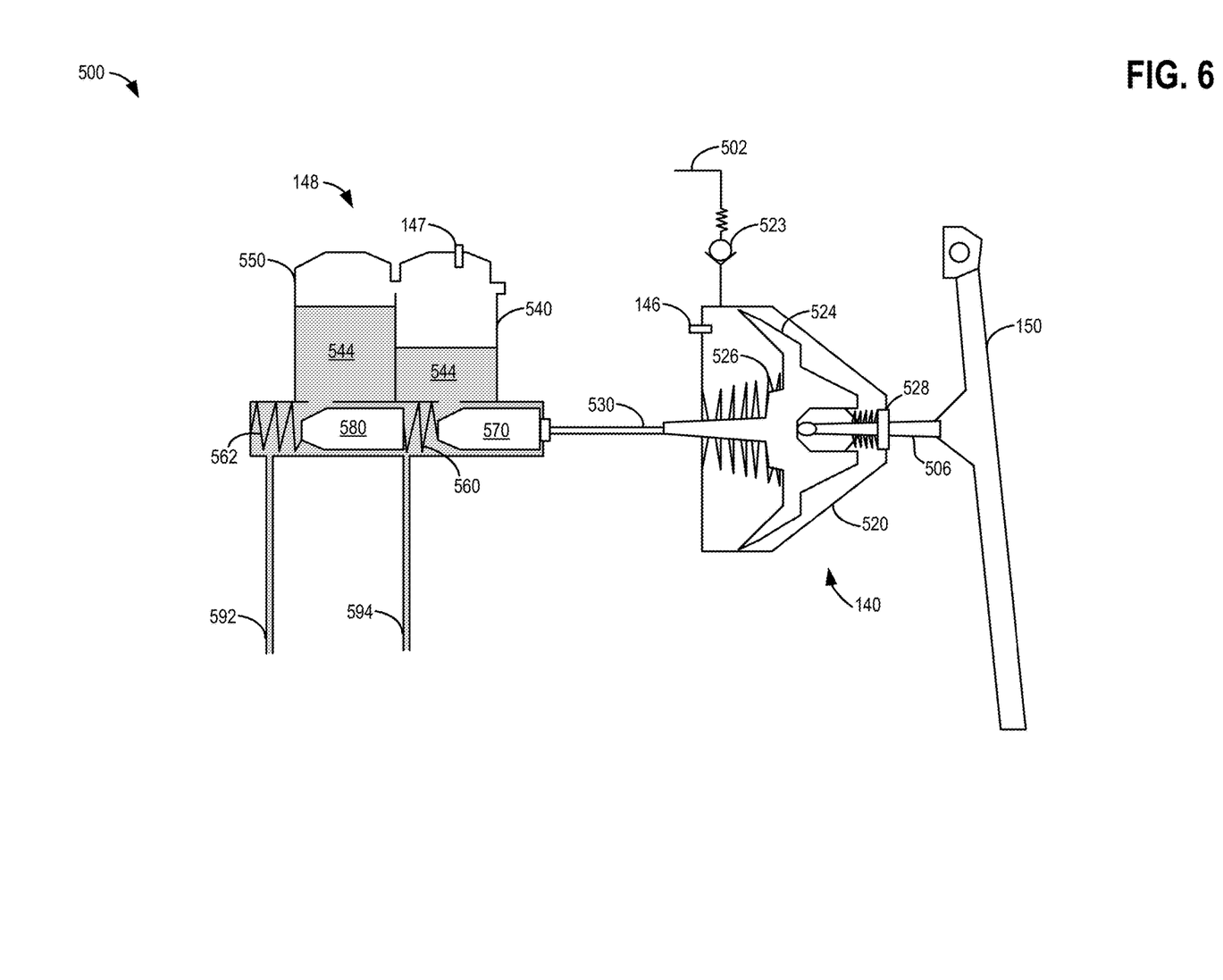
FIG. 6 shows a schematic of a cross-section of an example brake booster system.

The present description is related to vacuum scavenging in a hybrid-electric vehicle system. FIG. 1 shows one example of a propulsion system for a hybrid-electric vehicle system, including an electric motor, an engine such as internal combustion engine, and an energy storage device such as a battery. In FIG. 2 a detailed schematic of an example internal combustion engine is illustrated. The engine in FIG. 2 is an example of an aspirated internal combustion engine for supplying vacuum to vacuum actuated components of the hybrid-electric vehicle system. FIGS. 3-4 show flow charts for an example method of operating a hybrid-electric vehicle system, including supplying vacuum to vacuum actuated components. An example timeline for operating a hybrid-electric vehicle system, illustrating supplying vacuum to vacuum actuated components via an aspirated engine is shown in FIG. 5, and a schematic of an example brake booster system is shown in FIG. 6.

An aspirated engine may comprise one or more aspirators coupled to an intake air passage of an engine to harness engine airflow for generation of vacuum for use by various vacuum-actuated devices such as a brake booster. Aspirators (which may alternatively be referred to as ejectors, venturi pumps, jet pumps, and eductors) are passive devices that can provide low-cost vacuum generation, wherein an amount of vacuum generated at an aspirator can be controlled with a flow regulating valve controlling the motive air flow rate through the aspirator. For example, when incorporated in an engine intake system, aspirators may generate vacuum using energy that would otherwise be lost to throttling, and the generated vacuum may be used in vacuum-powered devices such as brake boosters.

Referring now to FIG. 1, it illustrates an example vehicle propulsion system 100. Vehicle propulsion system 100 includes a fuel burning engine 10 and a motor 13. As a non-limiting example, engine 10 comprises an internal combustion engine and motor 13 comprises an electric motor. Motor 13 may be configured to utilize or consume a different energy source than engine 10. For example, engine 10 may consume a liquid fuel (e.g. gasoline) to produce an engine output while motor 13 may consume electrical energy to produce a motor output. As such, a vehicle with propulsion system 100 may be referred to as a hybrid-electric vehicle (HEV).

Vehicle propulsion system 100 may utilize a variety of different operational modes depending on operating conditions encountered by the vehicle propulsion system. Some of these modes may enable engine 10 to be maintained in an off state (e.g. set to a deactivated state) where combustion of fuel at the engine is discontinued. For example, under select operating conditions, motor 13 may propel the vehicle via drive wheel 17 as indicated by arrow 11 while engine 10 is deactivated.

During other operating conditions, engine 10 may be set to a deactivated state (as described above) while motor 13 may be operated to charge energy storage device 15 such as a battery. For example, motor 13 may receive wheel torque from drive wheel 17 as indicated by arrow 11 where the motor may convert the kinetic energy of the vehicle to electrical energy for storage at energy storage device 15 as indicated by arrow 124. This operation may be referred to as regenerative braking of the vehicle. Thus, motor 13 can provide a generator function in some embodiments. However, in other embodiments, generator 16 may instead receive wheel torque from drive wheel 17, where the generator may convert the kinetic energy of the vehicle to electrical energy for storage at energy storage device 15 as indicated by arrow 163.

During still other operating conditions, engine 10 may be operated by combusting fuel received from fuel system 190 as indicated by arrow 192. For example, engine 10 may be operated to propel the vehicle via drive wheel 17 as indicated by arrow 9 while motor 13 is deactivated. During other operating conditions, both engine 10 and motor 13 may each be operated to propel the vehicle via drive wheel 17 as indicated by arrows 15 and 11, respectively. A configuration where both the engine and the motor may selectively propel the vehicle may be referred to as a parallel type vehicle propulsion system. Note that in some embodiments, motor 13 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 13, which may in turn propel the vehicle via drive wheel 17 as indicated by arrow 11. For example, during select operating conditions, engine 10 may drive generator 16, which may in turn supply electrical energy to one or more of motor 13 as indicated by arrow 14 or energy storage device 15 as indicated by arrow 163. As another example, engine 10 may be operated to drive motor 13 which may in turn provide a generator function to convert the engine output to electrical energy, where the electrical energy may be stored at energy storage device 15 for later use by the motor.

Fuel system 190 may include one or more fuel storage tanks 191 for storing fuel on-board the vehicle. For example, fuel tank 191 may store one or more liquid fuels, including but not limited to: gasoline, diesel, and alcohol fuels. In some examples, the fuel may be stored on-board the vehicle as a blend of two or more different fuels. For example, fuel tank 191 may be configured to store a blend of gasoline and ethanol (e.g. E10, E85, etc.) or a blend of gasoline and methanol (e.g. M10, M85, etc.), whereby these fuels or fuel blends may be delivered to engine 10 as indicated by arrow 192. Still other suitable fuels or fuel blends may be supplied to engine 10, where they may be combusted at the engine to produce an engine output. The engine output may be utilized to propel the vehicle as indicated by arrow 9 or to recharge energy storage device 15 via motor 13 or generator 16.

In some embodiments, energy storage device 15 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 15 may include one or more batteries and/or capacitors.

Controller 12 may communicate with one or more of engine 10, motor 13, fuel system 190, energy storage device 15, and generator 16. As further described below, controller 12 may receive sensory feedback information from one or more of engine 10, motor 13, fuel system 190, energy storage device 15, and generator 16. Further, controller 12 may send control signals to one or more of engine 10, motor 13, fuel system 190, energy storage device 15, and generator 16 responsive to this sensory feedback. Controller 12 may receive an indication of an operator requested output of the vehicle propulsion system from a vehicle operator 132. For example, controller 12 may receive sensory feedback from an accelerator pedal position sensor 134 which communicates with accelerator pedal 130. Controller 12 may also receive sensory feedback from a brake pedal position sensor 154 which communicates with brake pedal 150.

Energy storage device 15 may periodically receive electrical energy from a power source 180 residing external to the vehicle (e.g. not part of the vehicle) as indicated by arrow 184. As a non-limiting example, vehicle propulsion system 100 may be configured as a plug-in hybrid-electric vehicle (HEV), whereby electrical energy may be supplied to energy storage device 15 from power source 180 via an electrical energy transmission cable 182. During a recharging operation of energy storage device 15 from power source 180, electrical transmission cable 182 may electrically couple energy storage device 15 and power source 180. While the vehicle propulsion system is operated to propel the vehicle, electrical transmission cable 182 may disconnected between power source 180 and energy storage device 15. Controller 12 may identify and/or control the amount of electrical energy stored at the energy storage device, which may be referred to as the state of charge (state-of-charge).

In other embodiments, electrical transmission cable 182 may be omitted, where electrical energy may be received wirelessly at energy storage device 15 from power source 180. For example, energy storage device 15 may receive electrical energy from power source 180 via one or more of electromagnetic induction, radio waves, and electromagnetic resonance. As such, it will be appreciated that any suitable approach may be used for recharging energy storage device 15 from a power source that does not comprise part of the vehicle. In this way, motor 13 may propel the vehicle by utilizing an energy source other than the fuel utilized by engine 10.

Fuel system 190 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 191 may be configured to store the fuel received from fuel dispensing device 170 until it is supplied to engine 10 for combustion.

This plug-in hybrid-electric vehicle, as described with reference to vehicle propulsion system 100, may be configured to utilize a secondary form of energy (e.g. electrical energy) that is periodically received from an energy source that is not otherwise part of the vehicle.

The vehicle propulsion system 100 may also include a message center 196, ambient temperature/humidity sensor 198, and a roll stability control sensor, such as a lateral and/or longitudinal and/or yaw rate sensor(s) 199. The message center may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, etc. In an alternative embodiment, the message center may communicate audio messages to the operator without display. Further, the sensor(s) 199 may include a vertical accelerometer to indicate road roughness. These devices may be connected to controller 12. In one example, the control system may adjust engine output and/or the wheel brakes to increase vehicle stability in response to sensor(s) 199.

Referring to FIG. 2, internal combustion engine 10, comprising a plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system 190 including a fuel tank 191, fuel pump (not shown), and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. A high pressure, dual stage, fuel system 190 may be used to generate higher fuel pressures at injectors 66. Intake manifold 44 also provides vacuum to brake booster 140 via conduit 142. Check valve 144 ensures air flows from brake booster 140 to intake manifold 44 and not from intake manifold 44 to brake booster 140. Brake booster 140 amplifies force provided by operator 132 via brake pedal 150 to master cylinder 148 for applying vehicle brakes (not shown).

FIG. 6 illustrates an example brake system for a vehicle system, including brake booster 140, master cylinder 148, and brake pedal 150. Brake booster 140 may comprise a canister 520 including a check valve 523 and flexible diaphragm 524. A rod 530 passing through the center of the canister 520 connects to a primary piston 570 of master cylinder 148. Brake booster 140 is linked to the brake pedal 150 via rod 506. Check valve 523 allows air to be drawn from the canister 520 by applying vacuum through vacuum line 502, but does not allow air to flow to the canister 520 via vacuum line 502. As such, in the event of a leak in vacuum line 502, or when the engine is off, the brake booster vacuum level will be maintained. Vacuum line 502 may fluidly connect the brake booster 140 to the intake manifold 44 directly and/or via ejector 20 (as shown in FIG. 2). Springs 526 and 528 maintain the diaphragm at an intermediate position in the canister 520 and help to reduce bottoming out of the diaphragm on either side of the canister 520.

Vacuum may be supplied from engine 10 (e.g., via intake manifold and/or ejector 20) to the brake booster 140 so that an equivalent vacuum is established on both sides of flexible diaphragm 524 in canister 520. Depressing the brake pedal 150, opens valve 528 and allows air to enter the canister 520 on one side of the diaphragm, while sealing off vacuum at vacuum line 502. The higher pressure on the one side of the diaphragm boosts the force of depressing the brake pedal 150 in pushing on the primary piston 520 of the master cylinder 148 via rod 530. As pressure builds in the master cylinder 148, the primary piston 520 compresses spring 560 and fluid 544, and forces the secondary piston 580 to compress spring 562 and fluid 544. The compressed fluid is delivered via brake lines 592 and 524 to the vehicle wheels in order to actuate the brakes. Releasing the brake pedal 150 closes valve 528, sealing off flow of ambient air into the canister 520, while allowing vacuum via vacuum line 502.

Accordingly, while the vehicle is stationary, repeated bobbing of the brake pedal by the vehicle operator may repeatedly cycle valve 528, thereby allowing ambient air into canister 520, and progressively depleting the vacuum levels in the brake booster 140. Furthermore, when a hybrid vehicle is stationary and the engine is off, an engine pull-up may be automatically performed in order to generate vacuum for replenishing depleted vacuum levels in the brake booster 140 (e.g., brake booster vacuum less than a threshold brake booster vacuum). Bobbling the brake pedal in a hybrid vehicle system may thereby increase the frequency of automatic engine pull-ups, and thereby reduce overall fuel economy.

In conventional vehicle systems, vacuum may be supplied to the brake booster via vacuum line 502 responsive to the brake booster vacuum level. For example, if the brake booster vacuum falls below a lower threshold brake booster vacuum level, then vacuum may be supplied to the brake booster directly from intake manifold and/or via an ejector, and/or vacuum pump. Furthermore, if the brake booster vacuum level is greater than or equal to an upper threshold brake booster vacuum level, vacuum to the brake booster from one or more of the intake manifold, ejector, and vacuum pump may be blocked.

Accordingly, these conventional vehicle systems supply vacuum to the brake booster only when a brake booster vacuum is below a lower threshold brake booster vacuum level, and do not supply vacuum to the brake booster when a brake booster vacuum is above an upper threshold brake booster vacuum level. Thus, these conventional vehicle systems fail to increase brake booster vacuum levels under other engine operating conditions. Because the hybrid-electric vehicle systems and methods therefor described herein can supply vacuum to the brake booster (and other vacuum actuated devices and systems) independent of brake booster vacuum levels and even when the brake booster vacuum level is greater than an upper threshold brake booster vacuum level, they achieve the advantage of reducing automatic engine pull-ups and increasing overall fuel economy as compared to conventional vehicle systems.

Returning to FIG. 2, as described above, ejector 20 may supply vacuum to any one or more vacuum actuated systems or devices such as an exhaust gas recirculation system, crankcase ventilation system, fuel vapor purge system, brake booster, vacuum amplifier, and the like. For example, as shown in FIG. 2, ejector 20 may supply vacuum to brake booster 140 via check valve 143. Check valve 143 ensures air flows from brake booster 140 to ejector 20 and not from ejector 20 to brake booster 140. Ejector control valve 21 allows air to be directed from boost chamber 46 through ejector 20 and to intake manifold 44 or air intake 42 via check valves 145 and 141. In this way, air may be directed to the lowest pressure area in the engine intake system while ejector 20 is providing vacuum to the vacuum system.

Although not shown in FIG. 2, additional pressure sensors may be provided both upstream and downstream of ejector 20 for determining pressures in engine intake air bypass passages just upstream and downstream of ejector 20. Furthermore, these additional pressure sensors may allow a pressure differential across ejector 20 to be determined.

In some examples, ejector 20 may comprise a larger than conventionally-sized ejector. For example, the constricted throat portion of the ejector may be 4-6 mm in diameter, which is larger than a conventional ejector having a throat diameter of 1-2 mm.

A fuel vapor purging system comprising a fuel vapor canister 23 may hold stored fuel vapors from a fuel tank 191 or other fuel vapor sources. Evaporative emission control valve 24 allows air from the atmosphere to be drawn into fuel vapor canister 23 and into intake manifold 44 when open. Thus, air can be supplied to engine 10 when evaporative emission control valve 24 is open. The state of evaporative emission control valve 24 is adjusted via controller 12.

An engine crankcase ventilation system comprising an engine crankcase 25 may hold crankcase gases. PCV control valve 26 allows gases from the engine crankcase to be drawn into intake manifold 44 when open. Thus, crankcase gases can be supplied to engine 10 when PCV control valve 24 is open. The state of PCV control valve 26 is adjusted via controller 12.

HVAC actuators 28 can adjust heating and ventilation ducts when HVAC control valve 27 is open allowing air to flow from HVAC actuators 28. Thus, air can be supplied to engine 10 from HVAC actuators 28 when HVAC control valve 24 is open. The state of HVAC control valve 24 is adjusted via controller 12.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 2 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; an accelerator pedal position sensor 134 coupled to an accelerator pedal 130 for sensing accelerator position adjusted by operator 132; a brake pedal position sensor 154 coupled to brake pedal 150 for sensing brake pedal position, an optional pressure sensor 90 for sensing cylinder pressure; a pressure sensor 146 for sensing brake booster vacuum; a pressure sensor 147 for sensing master cylinder pressure (e.g., hydraulic brake pressure); a knock sensor for determining ignition of end gases (not shown); a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

In this manner, a hybrid-electric vehicle system may comprise an engine, including a brake booster ejector, and a flow control valve coupled to the brake booster ejector control valve, a motor, a controller, including executable instructions to during a first condition, comprising when an engine intake manifold vacuum is greater than a threshold intake manifold vacuum, direct engine intake air through an ejector to draw vacuum from a brake booster even when a brake booster vacuum is greater than a threshold brake booster vacuum. As such, the hybrid-electric vehicle system may reduce the frequency of automatic engine pull-ups as compared with conventional vehicle systems, thereby reducing fuel economy.

Turning now to FIGS. 3 and 4, they illustrate flow charts for example methods 200 and 300, respectively, of operating a hybrid vehicle system. In particular, methods 200 and 300 may include supplying vacuum to one or more vacuum actuated components such as a brake booster of the hybrid vehicle system under certain hybrid vehicle system operating conditions. Furthermore, methods 200 and 300 may be executed by controller 12 of a hybrid-electric vehicle system.

Method 200 begins at 210 by estimating and/or measuring vehicle operating conditions such as engine operating condition (EOC), torque (Tq), vehicle speed (Vs), engine intake manifold vacuum (MANVAC), engine speed (Engine$_{rpm}$), intake bypass passage pressures upstream and downstream of an ejector ($P_{up,ejector}$, $P_{up,ejector}$, respectively), battery state of charge (SOC), etc. Method 200 continues at 220, where it determines if either the engine is idle, comprising when the engine is on but the accelerator pedal is not depressed, or if engine tip-out, comprising when the accelerator pressure has just been released, has occurred. If engine tip-out has not occurred and if the engine is not idle, then method 200 continues at 226, where it determines if vacuum can be scavenged during non-engine tip-out or non-idle engine conditions (FIG. 4).

If either the engine is idle or engine tip-out has just occurred at 220, method 200 continues determines if vacuum can be scavenged during engine tip-out or idle engine conditions. At 230, method 200 determines if MANVAC>0, for example from pressure sensor 122 positioned at intake manifold 44. If MANVAC>0, then the ambient pressure or barometric pressure (BP) is greater than MANVAC, and it is possible to direct air through the ejector 20 for supplying vacuum to a vacuum actuated device or system such as a brake booster. In other examples, vacuum may be supplied via ejector 20 to one or more of an exhaust gas recirculation system, crankcase ventilation system, fuel vapor purge system, brake booster, vacuum amplifier, and the like. Vacuum may also be supplied via ejector 20 to other vacuum actuated devices.

If MANVAC>0, method 200 continues at 240, where it determines if engine speed, Engine$_{rpm}$, is greater than a threshold engine speed, Engine$_{rpm,TH}$. As described above with reference to FIG. 2, engine speed may be measured with a Hall Effect sensor 118 that measures crankshaft position, from which engine speed may be determined. In some examples Engine$_{rpm,TH}$ may be 0, however in other examples, Engine$_{rpm,TH}$ may correspond to a predetermined engine speed greater than 0. In some hybrid-electric vehicle systems, below Engine$_{rpm,TH}$, directing flow through ejector 20 may increase NVH, and may thus be undesirable. For example, in vehicles with sub-optimal under-hood-to-cab acoustics, directing air flow through ejector 20 when engine speed is less than Engine$_{rpm,TH}$ may cause aspirator whoosh, leading to increased NVH. Accordingly, by determining if engine speed is greater than Engine$_{rpm,TH}$, increased NVH from directing air flow through ejector 20 may be reduced. As described above with reference to FIG. 2, air may be directed through ejector 20 for supplying vacuum from boost chamber 46. In unboosted (e.g., non-turbocharged, non-supercharged) hybrid-electric vehicle systems, air may be directed through ejector 20 for supplying vacuum from air intake 42. For the case of a boosted engine, intake air flow may refer to air flow from the air intake 42 and/or air flow from the boost chamber 46. Hybrid-electric vehicle systems comprising turbocharged or supercharged engines may be advantageous in that it may be possible to direct flow through ejector 20 and supply vacuum to vacuum actuated devices and/or systems under a broader range of engine operating conditions. If the engine speed is 0 (e.g., engine off), then the engine pistons are no longer moving and pumping air through the engine, and air flow cannot be directed to flow through ejector 20.

If Engine$_{rpm}$>Engine$_{rpm,TH}$, method 200 continues at 260, where it determines if fuel flow to the engine is OFF. Although the engine is idle or engine tip-out has just occurred, residual fuel in the fuel lines, for example at a fuel system fuel rail, may still momentarily flow to the engine cylinders via fuel injectors 66. Directing air flow through the ejector 20 while fuel is delivered to the engine may cause engine surge. Accordingly, blocking air flow to the ejector 20 while fuel flow to the engine is ON may reduce engine surge and increase vehicle drivability and operability. Thus, following an engine tip-out, wherein an engine is transitioning from a moving to an idle condition, air flow may be directed to the ejector 20 only after fuel flow to the engine is shut off.

Next, if fuel flow to the engine is OFF, method 200 continues at 270, where it may determine if an intake bypass pressure upstream of the ejector 20, $P_{up,ejector}$, is greater than an intake bypass pressure downstream of the ejector 20, $P_{down,ejector}$, by more than a threshold pressure differential, $\Delta P_{TH}$. If $P_{up,ejector} - P_{down,ejector} > \Delta P_{TH}$ (e.g., $\Delta P_{ejector} > \Delta P_{TH}$), then air flow may be directed through ejector 20, thereby generating vacuum that can be supplied to brake booster 140. On the other hand, during engine conditions where $P_{up,ejector} - P_{down,ejector} < \Delta P_{TH}$, adequate flow may not be directed through ejector 20 to supply substantial vacuum via ejector 20 to brake booster 140. As examples, $P_{up,ejector} - P_{down,ejector} < \Delta P_{TH}$ when the engine speed is low (e.g., low MAF), when intake manifold pressure is near the barometric pressure. Furthermore, $P_{up,ejector}-P_{down,ejector}$ may be less than $\Delta P_{TH}$ under a broader range of engine speeds and/or MAP's for non-turbocharged and non-supercharged engines.

If $P_{up,ejector}-P_{down,ejector}>\Delta P_{TH}$, method 200 continues at 280 where it determines if a brake actuator is released and brake pedal position is substantially still. If the brake pedal is depressed (e.g., not released), or not substantially settled (e.g. brake pedal position is still changing after being released), then the pressure in the brake booster canister 520 may be increasing due to the brake booster canister valve 528 being open. As another example, if the brake booster pressure is constant or if the rate of change of the brake booster pressure is less than a threshold rate of change, the brake pedal position may be determined to be substantially still. As a further example, if valve 528 is closed, the brake pedal position may be determined to be substantially still. As such, when the brake pedal is released and the brake pedal position is constant, the brake booster pressure is constant, and the brake booster vacuum may be increased by directing air flow through ejector 20 to supply vacuum via vacuum line 502. Supplying vacuum to brake booster 140 prior to the brake pedal being released or prior to the settling of the brake pedal position is not advantageous because ambient air intrusion into the brake booster will increase since brake booster canister valve 528 is open.

Intrusion rates of ambient air into the brake booster may be highest just following release of the brake pedal 150, and before the brake pedal position has settled. Thus, in order to reduce a frequency of automatic engine pull-ups due to depleted brake booster vacuum (e.g., due to brake pedal bobbling) and enhance overall fuel economy, it may be advantageous to supply vacuum to the brake booster responsive or following release of the brake pedal, and after the brake pedal position has settled, when the brake booster canister valve 528 has closed, and/or when the rate of change in the brake booster pressure is less than a threshold rate of change.

Following 280, if the brake pedal is released and the brake pedal position is constant, method 200 may determine that a first condition has been met, whereby air flow is directed to ejector 20 by opening ejector control valve 21 at 290. Opening ejector control valve 21 allows air to be directed from boost chamber 46 through ejector 20 and to intake manifold 44 or air intake 42 via check valves 145 and 141. In this way, air may be directed to the lowest pressure area in the engine intake system while ejector 20 is providing vacuum to the vacuum actuated devices and/or systems, such as the brake booster 140. After 290, method 200 ends.

If method 200 determines at 220 that the engine is not idling or engine tip-out has not just occurred; at 230 that MANVAC is not less than 0; at 240 that $Engine_{rpm}<Engine_{rpm,TH}$; at 260 that fuel flow to the engine is on; at 270 if $P_{up,ejector}-P_{down,ejector}<\Delta P_{TH}$; or at 280 that the brake has not been released or the brake pedal position is not constant, method 200 continues at 296, where the ejector control valve 21 is closed. For example, following engine tip-out, a first condition may be met and method 200 may momentarily open ejector control valve 21 at 290 to supply vacuum to the brake booster 140. However in order to bring the vehicle to a stop (e.g., due to an approaching stop light), the brake pedal may be depressed, and in response method 200 may detect the depressed brake pedal at 280 and close ejector control valve 21 at 296.

In other examples, a method for supplying vacuum to the vacuum actuated devices and/or systems may perform a subset or a combination comprising one or more than one of steps 230 through 280 described above.

Turning now to FIG. 4, a method 300 of supplying vacuum to one or more vacuum actuated components such as a brake booster of the hybrid vehicle system under a second condition, not including when the engine is idling or just following an engine tip-out. Method 300 begins at 306 where it determines if fuel flow to the engine is ON. If fuel flow to the engine is ON, the engine may be running and generating sufficient vacuum at the intake manifold to supply vacuum to the brake booster while directing at least a portion of the intake air flow to the ejector.

Method 300 continues at 310 where it determines if MANVAC is greater than a threshold MANVAC, $MANVAC_{TH}$. If $MANVAC>MANVAC_{TH}$, then the pumping pistons of the engine are pulling sufficient vacuum to provide enough oxygen to the engine cylinders in order to maintain current engine fuel economy, engine performance, emission levels, NVH, and other engine operating parameters associated with vehicle operability and drivability. In some examples, $MANVAC_{TH}$ may be predetermined, and may also be a function of engine operating conditions. For example, under high engine loads (e.g., driving up a steep hill, and the like), $MANVAC_{TH}$ may be higher than when the engine load is low (e.g. driving on a smooth level road without rapid acceleration, and the like).

If $MANVAC>MANVAC_{TH}$, then method 300 continues at 320 where it determines if engine operation can be sustained without impacting vehicle drivability and operability while directing air flow to the ejector. For example, as shown in FIG. 4, method 300 may assess whether fuel flow, variable cam timing (VCT), intake manifold runner control (IMRC), spark timing, turbocharging, and the like can be maintained if air flow is diverted to the ejector without negatively impacting emission levels, NVH, and current engine fuel economy. For example, under low engine load conditions, directing air flow to the ejector, and thus bypassing the throttle, may cause engine surge, reducing current engine fuel economy and reducing vehicle drivability. As another example, under very high engine load conditions, directing air flow to the ejector, and thus redirecting boosted air from intake boost chamber 46 back to the air intake 42, may reduce engine torque, thereby reducing vehicle drivability and operability. In this manner, the assessment performed by method 300 at 320 may depend on several engine operating parameters and conditions, for example if the engine is operating at high or low loads, if the engine speed is high or low, if the vehicle speed is high or low (e.g., NVH may be more highly influenced at higher vehicle speeds), and the like.

If method 300 determines that air flow may be directed to ejector 20 while maintaining fuel flow, variable cam timing (VCT), intake manifold runner control (IMRC), spark timing, turbocharging, and the like, and without negatively impacting emission levels, NVH, and current engine fuel economy, then method 300 continues at 330, where it determines if upon directing air to ejector 20 air flow to the engine may be rebalanced. As an example, air flow may be rebalanced if a portion of the intake air flow to the throttle is bypassed by directing air flow to the ejector 20.

If air flow to the engine is to be rebalanced, method 300 continues at 334 where the throttle is adjusted to rebalance air flow to the engine. For example, if air flow to the engine is increased (due to throttle bypassing), the air flow to the engine may be rebalanced by adjusting (partially closing) the throttle. In this manner, the throttle may be adjusted in response to directing at least a portion of the intake air flow to the ejector 20, in order to rebalance the air flow to the engine.

Next, at 340, method 300 opens (or partially opens) ejector control valve 21 in order to direct at least a portion of the intake air flow to ejector 20 for supplying vacuum to vacuum actuated devices and/or systems such as brake booster 140. In some examples, method 300 may perform steps 330, 334 and 340 simultaneously so that the air flow to the engine is maintained constant by concomitantly adjusting the throttle to rebalance air flow to the engine as the ejector control valve is opened.

If at 306 fuel flow is OFF, and if at 310 MANVAC<$MANVAC_{TH}$, or if method 300 determines at 320 that at least one of fuel flow, variable cam timing (VCT), intake manifold runner control (IMRC), spark timing, or turbocharging, cannot be maintained if air flow is diverted to the ejector without negatively impacting emission levels, NVH, and current engine fuel economy, then method 300 closes ejector control valve 21 at 350. Rebalancing air flow to the engine may be performed via steps 336 and 338 (similar to steps 330 and 334) simultaneously or concomitantly with 350 by controller 12 in order to maintain air flow to the engine as the ejector control valve 21 is closed. After 340 and 350 method 300 ends.

Opening ejector control valve 21 at 290 and 340 of methods 200 and 300 may comprise partially and/or fully opening ejector control valve 21. Further still, the degree of opening ejector control valve 21 may depend on engine operating conditions, wherein 290 and 340 may further comprise partially opening ejector control valve 21. As one example, the degree of opening ejector control valve may be higher when $P_{up,ejector} - P_{down,ejector}$ is larger as compared to when $P_{up,ejector} - P_{down,ejector}$ is smaller. As a further example, the degree of opening ejector control valve may be higher when MANVAC is larger as compared to when MANVAC is smaller.

In this manner, a method for a hybrid-electric vehicle may comprise while the hybrid-electric vehicle is moving and in an absence of fuel being directed to an engine, directing engine intake air through an ejector to supply vacuum to a brake booster independent of a brake booster vacuum. Furthermore, directing engine intake air through the ejector may comprise opening a valve fluidly coupled to the ejector. The method may further comprise directing engine intake air through the ejector only when a pressure differential across the ejector is greater than a threshold pressure difference. Furthermore, the method may comprise blocking engine intake air from the ejector when an engine speed is below a threshold engine speed, blocking engine intake air from the ejector while fuel is being directed to the engine following an engine tip-out. Further still, the method may comprise directing engine intake air through the ejector only after a brake actuator is released, and directing engine intake air through the ejector only when a brake actuator demand is constant.

In another embodiment, a method for a hybrid-electric vehicle may comprise during a second condition, comprising when an engine intake manifold vacuum is greater than a threshold intake manifold vacuum, directing engine intake air through an ejector to draw vacuum by the ejector from a brake booster independent of a brake booster vacuum. The method may further comprise during a first condition, comprising while the hybrid-electric vehicle is moving and in an absence of fuel being directed to an engine, directing engine intake air through the ejector to supply vacuum to the brake booster independent of the brake booster vacuum. Furthermore, the second condition may further comprise fuel being delivered to an engine, and directing engine intake air through the ejector without changing fuel flow to the engine. Further still the method may further comprising during the second condition, directing engine intake air through the ejector without changing variable cam timing.

During the second condition, engine intake air may be directed through the ejector without changing fuel-to-air ratio, and a throttle may be adjusted to maintain air flow to the engine when the engine intake air is directed through the ejector. Furthermore, during the second condition, engine intake air may be directed through the ejector even when a vacuum level in the vacuum reservoir is greater than an upper vacuum threshold.

In another embodiment, a method for a hybrid vehicle system may comprise independent of a vacuum level of a vacuum reservoir, during a condition when the hybrid vehicle system is propelled only with motor torque, opening a valve fluidly coupled to an ejector, whereupon opening the valve, vacuum is drawn from the ejector to the vacuum reservoir. The method may further comprise blocking engine intake air from the ejector when an engine speed is below a threshold engine speed. Furthermore, the method may comprise blocking engine intake air from the ejector while fuel is being directed to the engine, and directing engine intake air through the ejector only after a brake actuator is released. Further still, the vacuum reservoir may comprise one or more of a brake booster, exhaust gas recirculation system, crankcase ventilation system, fuel vapor purge system, brake booster, and vacuum amplifier.

Turning now to FIG. 5, it illustrates an example timeline 400 for operating a hybrid-electric vehicle system. FIG. 5 illustrates trend lines for accelerator pedal position 410, motor status, 416, MANVAC 420, engine rpm 430, vehicle speed 440, fuel flow to engine 450, ejector differential pressure 460, brake actuator level 470, brake booster vacuum 480, throttle position 406, ejector control valve 490, and ejector flow 496. FIG. 5 also shows trend lines for $MANVAC_{TH}$ 424, $engine_{rpm,TH}$ 434, threshold ejector differential pressure ($\Delta P_{TH}$) 466, upper threshold brake booster vacuum level 488, and lower threshold brake booster vacuum level 486.

Prior to t1, the timelines depict conditions for a vehicle in motion, the vehicle being propelled by the engine, as indicated by the accelerator pedal position 410 and fuel flow to the engine 450. Vehicle propulsion by the engine may also be sporadically supplemented by an electric motor as shown by motor status 416 pulsing on and off prior to t1, in order to provide additional power to propel the vehicle and/or to reduce fuel consumption and/or vehicle emissions. Furthermore, even though MANVAC>0, engine rpm>$engine_{rpm,TH}$, $\Delta P_{ejector} > \Delta P_{TH}$, the brake pedal is released (brake actuator level is 0), a first condition is not satisfied since the engine is not idling and an engine tip-out has not just occurred. Further still, although MANVAC>$MANVAC_{TH}$ 424, controller 12 may determine prior to t1 that a second condition is not satisfied. For example, controller 12 may determine that prior to t1, at least one of fuel flow, variable cam timing (VCT), intake manifold runner control (IMRC), spark timing, or turbocharging, cannot be maintained if air flow is diverted to the ejector without negatively impacting emission levels, NVH, and current engine fuel economy.

However at t1, controller 12 may determine that vehicle conditions may satisfy a second condition, whereby fuel flow, variable cam timing (VCT), intake manifold runner control (IMRC), spark timing, and turbocharging, can be maintained if air flow is diverted to the ejector without negatively impacting emission levels, NVH, and current engine fuel economy. Thus, at t1, controller 12 may at least partially open ejector air control valve 21 to direct at least a portion of intake air flow to ejector 20 to supply vacuum to a vacuum actuated device and/or system such as brake booster 140. In response to opening ejector control valve 21, or concurrently with opening ejector control valve 21, controller 12 may also partially close throttle 62 in order to rebalance air flow to the engine. Furthermore, in response to ejector control valve status 490 being OPEN, ejector flow (e.g., air flow directed to the ejector) increases, and brake booster vacuum 480 increases.

At t2, controller 12 may determine that the second condition is no longer satisfied. In other words, at t2, at least one of fuel flow, variable cam timing (VCT), intake manifold runner control (IMRC), spark timing, or turbocharging, cannot be maintained if air flow is diverted to the ejector without negatively impacting emission levels, NVH, and current engine fuel economy. As such, controller 12 may close ejector control valve at t2, causing the ejector flow to drop to zero. Furthermore, controller 12 may partially open throttle 62 in order to rebalance air flow to the engine.

Next, at t3, engine tip-out occurs and the accelerator pedal is released (e.g., OFF). Following tip-out, the electric motor may switch ON in order to propel the vehicle while the engine transitions to idle and the engine rpm begins to decrease. In response to the engine tip-out, MANVAC also begins to decrease since the engine pistons slow their pumping, thereby drawing less vacuum at the intake manifold. Furthermore, fuel flow to the engine drops to zero quickly thereafter, and $\Delta P_{ejector}$ also begins to decrease. Further still, at t3, the vehicle operator may pump the brake pedal in order to decelerate the vehicle as shown by 470. In response to the brake pedal actuation, the brake booster vacuum level drops as ambient air is inhaled into the brake booster. Further still, the throttle closes because no fuel is being delivered to the engine. Even though engine tip-out has just occurred, because the brake pedal is not released between t3 and t4, a first condition is not satisfied, and controller 12 does not open the ejector control valve to direct air flow to the ejector. Ejector flow thus remains zero between t3 and t4.

At t4, controller 12 opens the ejector control valve to direct at least a portion of the intake air flow to the ejector since the brake pedal is released, and thus the first condition is satisfied. In response to opening the ejector control valve, ejector flow becomes non-zero, thereby supplying vacuum to the brake booster to increase the brake booster vacuum. As the engine transitions closer to idle following the engine tip-out, engine rpm, MANVAC, $\Delta P_{ejector}$ all decrease, and the rate of increase of the brake booster vacuum also decreases. Furthermore, at t4, a second condition is not satisfied since fuel is being delivered to the engine.

At t5, Engine$_{rpm}$ decreases lower than Engine$_{rpm,TH}$, and $\Delta P_{ejector}$ drops below $\Delta P_{TH}$. As such, a first condition is no longer satisfied, and controller 12 closes the ejector control valve, shutting off air flow to the ejector. Furthermore, MANVAC decreases below MANVAC$_{TH}$, and the motor remains on to propel the vehicle. At some time between t5 and t6, after the brake pedal is depressed, the vehicle speed 440 indicates that the vehicle comes to rest, perhaps to stop due to heavy traffic or at an intersection. Furthermore, engine speed drops to 0, as shown at 433. While stopped, the brake pedal is bobbled, and the brake actuator fluctuates causing the brake booster vacuum to decrease. However, because vacuum was supplied to the brake booster vacuum between t4 and t5 during the engine transition to idle, the brake booster vacuum does not drop to a low level, having a high level of vacuum stored thereat.

Next, at t6, engine tip-in occurs, as the operator releases the brake pedal (e.g., the brake actuator level drops to a constant level of zero) and depresses the accelerator pedal. In response, the engine rpm and fuel flow to the engine quickly increase as the engine rpm makes a step increase from 0 rpm (at 435), and the vehicle accelerates from a stop. In addition, the throttle opens quickly to deliver air flow to the engine and to maintain fuel-to-air ratio for drivability and operability. Between t6 and t7, a first condition is not satisfied since the engine is not idling and engine tip-out has not just occurred. Rather, engine tip-in has just occurred, and fuel flow to the engine is on. Furthermore, a second condition is not satisfied since MANVAC<MANVC$_{TH}$.

Just after t7, MANVAC rises above MANVAC$_{TH}$, and controller 12 determines that fuel flow, variable cam timing (VCT), intake manifold runner control (IMRC), spark timing, and turbocharging, can be maintained if air flow is diverted to the ejector without negatively impacting emission levels, NVH, and current engine fuel economy. Thus, controller 12 determines that a second condition just after t7 may be satisfied and ejector control valve is at least partially opened to direct at least a portion of the intake air flow to the ejector control valve. At t7, controller also partially reduces the throttle opening to rebalance air flow to the engine as air flow directed to the ejector bypasses throttle 62. Concurrent with air flow to the ejector, the brake booster vacuum begins to increase as vacuum generated at the ejector is supplied to the brake booster.

Continuing, after t7, controller 12 may open and close ejector control valve periodically, corresponding to when controller 12 determines that a second condition may be satisfied and a second condition may not be satisfied. For example, when at least one of fuel flow, variable cam timing (VCT), intake manifold runner control (IMRC), spark timing, and turbocharging, cannot be maintained if air flow is diverted to the ejector, or if at least one of emission levels, NVH, and current engine fuel economy are negatively impacted by directing air flow to the ejector, then a second condition may not be satisfied. After t7, FIG. 5 illustrates that when the ejector control valve is open, air flow is directed to the ejector, and brake booster vacuum increases. Furthermore, even when the brake booster vacuum is greater than a threshold brake booster vacuum 488, if a second condition is satisfied, controller 12 may still open the ejector control valve to direct air flow to the ejector and supply vacuum to the brake booster. In this way, the brake booster vacuum may be increased (e.g., overcharged) and thereby automatic engine pull-up frequency may be reduced, increasing overall fuel economy.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid-electric vehicle, comprising:
responsive to a non tip-out condition with a throttle at least partially open, when an engine intake manifold vacuum is greater than a threshold intake manifold vacuum, opening an ejector control valve and directing engine intake air through an ejector to generate vacuum by the ejector and draw air from a brake booster independent of a brake booster vacuum; and
during other conditions, when the engine intake manifold vacuum is greater than the threshold intake manifold vacuum, closing the ejector control valve.

2. The method of claim 1, further comprising:
responsive to a condition when the hybrid-electric vehicle is moving and in an absence of fuel being directed to an engine, directing engine intake air through the ejector to supply vacuum to the brake booster independent of the brake booster vacuum.

3. The method of claim 1, wherein the non tip-out condition further comprises fuel being delivered to an engine, and directing engine intake air through the ejector without changing fuel flow to the engine.

4. The method of claim 1, further comprising, during the non tip-out condition, directing engine intake air through the ejector without changing variable cam timing.

5. The method of claim 1, further comprising, during the non tip-out condition, directing engine intake air through the ejector without changing fuel-to-air ratio.

6. The method of claim 1, further comprising, during the non tip-out condition, adjusting the throttle to maintain air flow to an engine when the engine intake air is directed through the ejector.

7. The method of claim 1, wherein, during the non tip-out condition, engine intake air is directed through the ejector even when a vacuum level in a vacuum reservoir is greater than an upper vacuum threshold.

* * * * *